(12) United States Patent
Hughes

(10) Patent No.: US 7,522,998 B2
(45) Date of Patent: Apr. 21, 2009

(54) SYSTEM AND METHOD FOR DISPLAYING VEHICLE LOCATION INFORMATION

(75) Inventor: Alan S. Hughes, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 474 days.

(21) Appl. No.: 11/267,044

(22) Filed: Nov. 4, 2005

(65) Prior Publication Data

US 2006/0111838 A1    May 25, 2006

Related U.S. Application Data

(60) Provisional application No. 60/625,305, filed on Nov. 5, 2004.

(51) Int. Cl.
*G01C 21/32* (2006.01)

(52) U.S. Cl. .................... 701/211; 340/995.1

(58) Field of Classification Search ......... 701/200–202, 701/23–26, 208, 211, 213–215; 340/988, 340/995.1, 995.17, 995.19; 342/357.06, 342/357.12
See application file for complete search history.

(56) References Cited

U.S. PATENT DOCUMENTS

| | | | |
|---|---|---|---|
| 4,672,382 A | 6/1987 | Fukuhara et al. | |
| 4,743,913 A | 5/1988 | Takai | |
| 4,758,959 A | 7/1988 | Thoone et al. | |
| 4,912,645 A | 3/1990 | Kakihara et al. | |
| 4,949,268 A | 8/1990 | Nishikawa et al. | |
| 5,257,195 A | 10/1993 | Hirata | |
| 5,270,936 A | 12/1993 | Fukushima et al. | |
| 5,317,515 A | 5/1994 | Matsuzaki | |
| 5,394,333 A | 2/1995 | Kao | |
| 5,565,874 A | 10/1996 | Rode | |
| 5,625,556 A | 4/1997 | Janky et al. | |
| 5,644,572 A | 7/1997 | Olds et al. | |
| 5,663,735 A | 9/1997 | Eshenbach | |
| 5,689,252 A | 11/1997 | Ayanoglu et al. | |
| 5,724,316 A | 3/1998 | Brunts | |
| 5,848,373 A | 12/1998 | DeLorme et al. | |
| 5,991,690 A | 11/1999 | Murphy | |
| 6,115,669 A | 9/2000 | Watanabe et al. | |
| 6,167,347 A | 12/2000 | Lin | |
| 6,212,472 B1 | 4/2001 | Nonaka et al. | |
| 6,240,361 B1 * | 5/2001 | Ise et al. | 701/208 |
| 6,292,750 B1 | 9/2001 | Lin | |
| 6,311,129 B1 | 10/2001 | Lin | |
| 6,347,266 B1 * | 2/2002 | Kageyama | 701/25 |
| 6,424,914 B1 | 7/2002 | Lin | |
| 6,449,559 B2 | 9/2002 | Lin | |
| 6,483,856 B1 | 11/2002 | Bird | |
| 6,496,778 B1 | 12/2002 | Lin | |
| 6,926,374 B2 * | 8/2005 | Dudeck et al. | 303/191 |
| 2001/0020216 A1 | 9/2001 | Lin | |
| 2002/0120400 A1 | 8/2002 | Lin | |
| 2003/0009283 A1 | 1/2003 | Pratt | |

* cited by examiner

*Primary Examiner*—Yonel Beaulieu
(74) *Attorney, Agent, or Firm*—Foley & Lardner LLP

(57) ABSTRACT

A system for displaying vehicle location information in a vehicle includes a current location detection device configured to provide location data for a first location of the vehicle representing the vehicle's current location, a vehicle speed sensor configured to provide vehicle speed data and a database of road network information configured to include at least one of street names and addresses along the streets thereon. The location data may include a direction of travel for the vehicle. A microprocessor coupled to the current location detector, the vehicle speed sensor and the database, the microprocessor is configured to determine a second location of the vehicle at a predetermined time in the future based on the location data and vehicle speed data and to determine a position identifier corresponding to the second location of the vehicle. A display is coupled to the microprocessor and is configured to display the position identifier.

13 Claims, 7 Drawing Sheets

SYSTEM AND METHOD FOR DISPLAYING VEHICLE LOCATION INFORMATION

PRIORITY

This application claims the benefit of U.S. Provisional Application No. 60/625,305, filed Nov. 5, 2004.

FIELD OF THE INVENTION

The present invention relates generally to a navigation and display system for a vehicle and particularly to one which provides a display of points of interest, cross-streets, addresses or other vehicle location information as the vehicle travels along a highway or local roadway.

BACKGROUND OF THE INVENTION

A navigation system for a vehicle may provide vehicle position information to a vehicle occupant. The navigation system may receive position information from a location detection device, for example, a global positioning system (GPS). Numerous vehicle navigation systems provide graphic map displays which allow a vehicle operator to plan a travel route and to obtain information about arrival destinations. Other simplified navigation systems have been developed that allow a vehicle operator to identify the current location of the vehicle by street address and intersection information as well as basic points of interest information. Other vehicle position information may be provided such as the heading of the vehicle, a city name, state, zip code, highway/interstate name or number, mile marker, etc. Vehicle position information may be updated continuously or in response to a user request. The vehicle position information (e.g., a street address and name) displayed by such vehicle navigation systems, however, is typically a historical address, i.e., the address indicates where the vehicle was just located (e.g., the address just passed by the vehicle). This delay in displaying an address or other location information may be the result of the propagation time or delay between receiving GPS signals, calculating the vehicle position, interpolating the address and displaying the address.

There is a need, therefore, for a system and method for displaying vehicle location information that is corrected to account for any delay or latencies in determining the vehicle position. Accordingly, it would be advantageous to provide a vehicle location or navigation system that was configured to predict a vehicle position a predetermined time in the future.

SUMMARY OF THE INVENTION

In accordance with one embodiment, a system for displaying vehicle location information includes a current location detection device configured to provide location data for a first location of the vehicle representing the vehicle's current location, the location data including a direction of travel for the vehicle, a vehicle speed sensor configured to provide vehicle speed data, a database of road network information configured to include at least one of street names and addresses along the streets thereon, a microprocessor coupled to the current location detector, the vehicle speed sensor and the database, the microprocessor configured to determine a second location of the vehicle at a predetermined time in the future based on the location data and vehicle speed data and to determine a position identifier corresponding to the second location of the vehicle, and a display coupled to the microprocessor and configured to display the position identifier.

In accordance with another embodiment, a method for displaying vehicle location information in a vehicle includes receiving location data for a first location of the vehicle representing the vehicle's current location, the location data including a direction of travel for the vehicle, receiving vehicle speed data, determining a second location of the vehicle at a predetermined time in the future based on the location data and vehicle speed data, determining a position identifier corresponding to the second location of the vehicle, and displaying the position identifier.

BRIEF DESCRIPTION OF THE DRAWINGS

The invention will be more readily understood by reference to the following description taken with the accompanying drawings, in which.

DETAILED DESCRIPTION OF THE PREFERRED EMBODIMENTS

Figure 1:
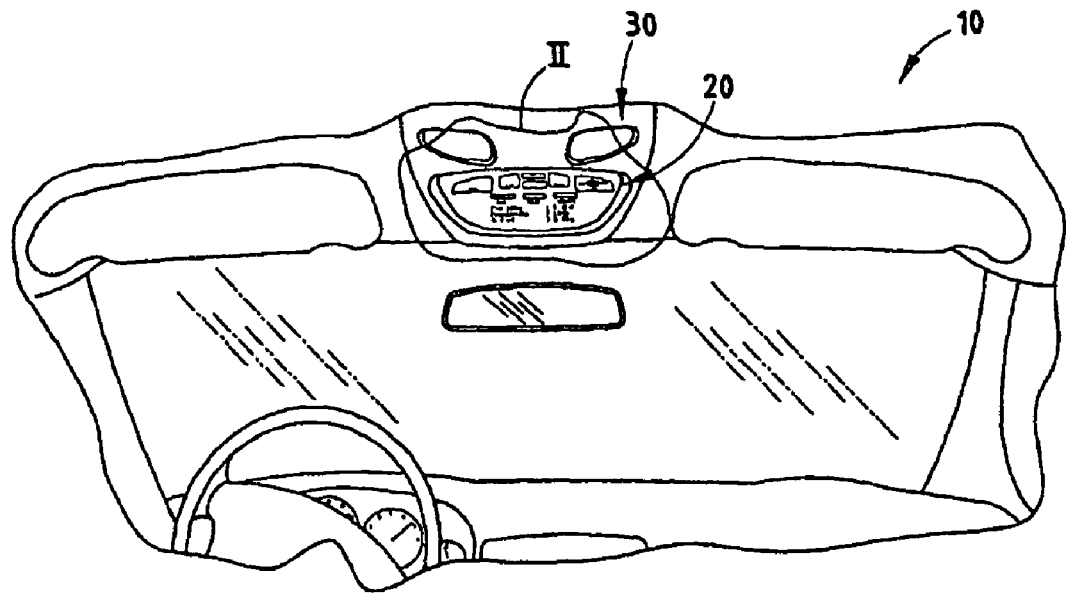
FIG. 1 is a fragmentary perspective view of a vehicle having a vehicle location and navigation system in accordance with an embodiment.
Figure 2:
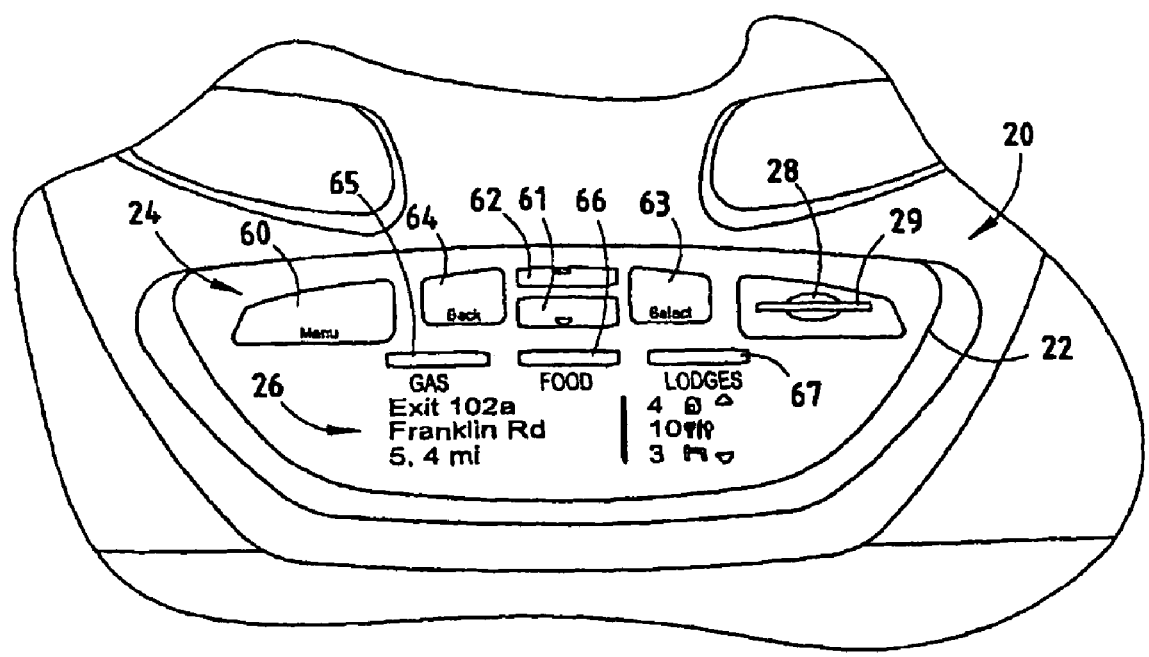
FIG. 2 is an enlarged fragmentary view of the system shown in FIG. 1 in accordance with an embodiment.

FIG. 1 is a fragmentary perspective view of a vehicle having a vehicle location or navigation system in accordance with an embodiment. In FIG. 1, there is shown a vehicle 10, such as an automobile, van, sports utility vehicle, truck, or the like, which incorporates a vehicle location and navigation system 20. The vehicle location and navigation system 20 may be mounted in, for example, an overhead console 30, although it may be mounted at any conveniently accessible location within easy reach of the vehicle operator, such as in an instrument panel, dashboard, visor; rearview mirror or other appropriate location in the vehicle. Vehicle location and navigation system 20 includes switches 24 and a display 26, shown in detail in FIG. 2. As shown in FIG. 2, vehicle location and navigation system 20 may be mounted within a housing 22, which includes both the display 26 and switches 24, as well as a memory card slot 28 for receiving a removable memory card 29, such as a flashcard on which point of interest (POI) and road network data is programmed. Alternatively, the components of system 20 may be mounted separately in different interior vehicle elements.

Memory card 29 may be, for example, a 128 meg card, although other sizes of memory cards such as a 256 or 512 meg memory card may be used. Memory card 29 is removable from slot 28, such that data thereon, including road network information and point-of-interest information, can be separately programmed in layers thereon, such that the road network and POI data can be refreshed at different, periodic intervals. Memory card 29 includes nonvolatile memory and contains a handshake code to communicate with a microprocessor 50 (shown in FIG. 3) of vehicle location and navigation system 20, so the microprocessor 50 can read data on the memory card 29.

Figure 3:
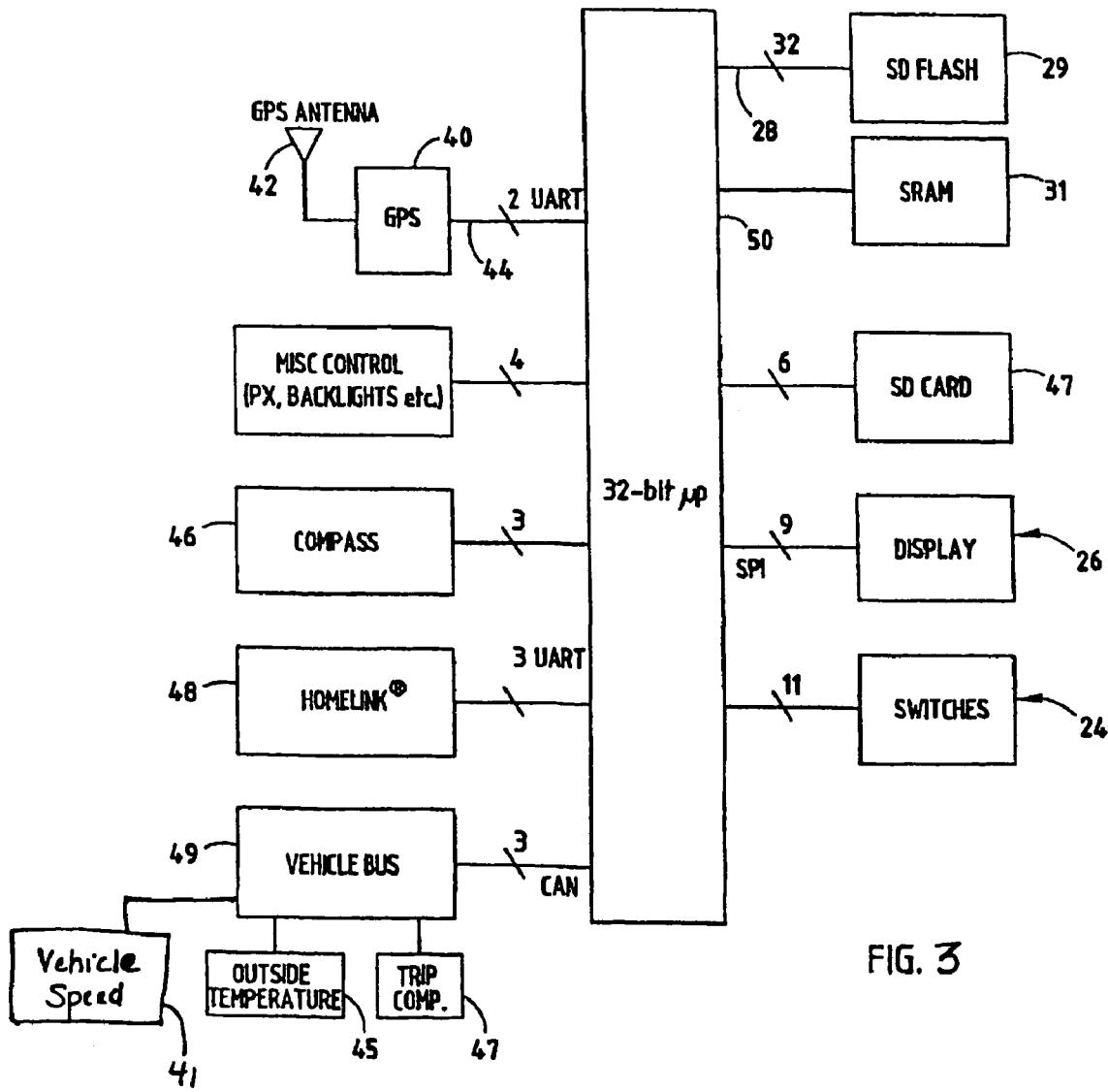
FIG. 3 is a block circuit diagram of a vehicle location and navigation system in accordance with an embodiment.

FIG. 3 is a block circuit diagram of a vehicle location and navigation system 20 including its major components in accordance with an embodiment. As shown in FIG. 3, vehicle location and navigation system 20 may also include a programmable SRAM memory 31, which contains the program for sequential operation of the system. In one embodiment, memory card 29 can be obtained from a car dealer with an update subscription service for refreshing the data on the card, either annually, in the case of road network information, or more frequently, as new points of interest may become available, for example, on a monthly basis. Alternatively, the user may subscribe to a Web site providing download information for refreshing the data on memory card 29 on a personal computer if desired. Memory card 29 may also be updated through other means. Typically, memory card 29 will have data sufficient for a regional area in which the vehicle normally travels and will contain points of interest according to categories, such as gas, food, and lodging, as well as all the major (i.e., limited access) and secondary road identifications and street addresses for secondary roads.

Vehicle location and navigation system 20, as shown in FIG. 3, includes a current location detection device such as a GPS system that includes a GPS receiver 40 mounted in the vehicle. GPS receiver 40 has an antenna 42 and is configured to receive (e.g., wirelessly) global positioning satellite signals from multiple satellites and provide current location data (e.g., positioning signals or other navigation data) to one or more microprocessor(s) 50 through a universal asynchronous receiver/transmitter connection 44. GPS receiver 40 generates location signals (e.g., latitude/longitude/altitude) representative of the location of the vehicle. Other current location detection sources of data, such as a Loran receiver, gyro compass, vehicle compass 46, a distance sensor, dead reckoning information sources, and/or other sources of location and navigation data, may also be employed in system 20. Microprocessor 50 receives vehicle location data from the GPS receiver (or other current location detection device) and point of interest information and road network data from the flashcard 29, which is inserted into slot 28 and coupled to the one or more microprocessor(s) 50. An SRAM memory 31 is also coupled to the one or more microprocessor(s) 50 and contains the system program. Microprocessor 50 is also coupled to one or more operator-actuated switches 24 and to a display 26, such as a dot matrix display, small cathode ray tube (CRT), a liquid crystal display (LCD), or other forms of displays, for selectively displaying information, such as shown in FIGS. 5-8, to the vehicle operator.

Figure 4:
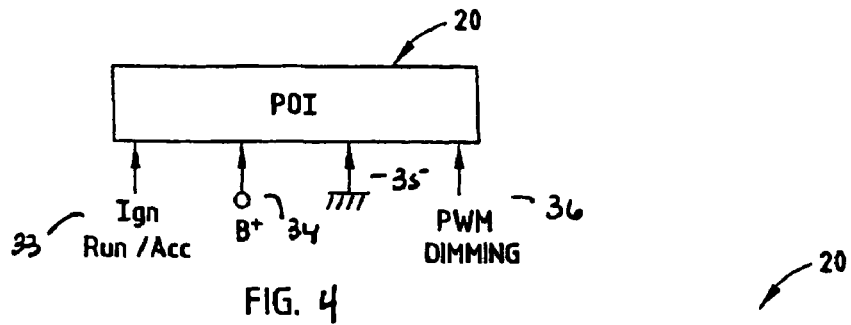
FIG. 4 is a block circuit diagram showing an exemplary interface connection of the vehicle location and navigation system to a vehicle power system in accordance with an embodiment.

Vehicle location and navigation system circuit 20 may be coupled to a vehicle power system as shown in FIG. 4 and includes an ignition input 33 for receiving power when the ignition is either in the run or accessory position, a B+ input 34 drawing a maximum of 300 micro amps when the system is deactivated, a coupling 35 to the system ground and a pulse width modulated dimming input circuit 36 for dimming the back-lighted switches 24 and the display 26 based upon the operator's selected lighting level for instrument displays. In some installations, the system could be coupled directly to the vehicle's power supply through the ignition switch and vehicle ground. In another, dimming information is received from the vehicle bus.

Returning to FIG. 3, microprocessor 50 is also coupled to other vehicle systems, such as a vehicle compass 46, for displaying in the normal mode of operation, when the vehicle location and navigation system is not being employed, an outside temperature, a compass heading, time and data information, etc. Microprocessor 50 may also be coupled to and employed for other vehicle control functions, such as a Homelink® brand programmable transmitter 48, and may be coupled to the vehicle bus 49 for receiving PWM dimming information, ignition run, accessory information and the like. An outside temperature sensor and circuit 45 may be coupled to microprocessor(s) 50 or vehicle bus 49, to provide the temperature display. Also a trip computer 47 may be coupled to microprocessor(s) 50 or to the vehicle bus 49 to provide typical trip functions, such as a resettable odometer, fuel consumption, average speed, and estimated time of arrival information, which can be displayed on display 26. In addition, a source of vehicle speed information 41 (e.g., a sensor, a speedometer circuit, other types of displacement differentiator, etc.) may be coupled to microprocessor(s) 50 or vehicle bus 49 to provide vehicle speed data. Other vehicle speed sensor types are contemplated, such as, using GPS positioning data from the GPS receiver 40.

Returning to FIG. 2, switches 24 incorporate a menu switch 60, a scroll forward switch 61, a scroll back switch 62. Scroll forward switch 61 and scroll back switch 62 are physically positioned on the console pointing in a forward and rearward positions, respectively, with arrows thereon so as to indicate to the vehicle operator that the actuation of the scroll switches 61, 62 advances the display to a point of interest, address or highway exit forward or behind the vehicle. Switch controls 24 also include a select switch 63 for selecting a given entry highlighted by the movement of a display cursor 27 (shown in FIG. 5) through actuation of scroll switches 61 and 62. A back switch 64 allows the operator to move back one entry. Additionally, keys 65, 66 and 67 are provided and are aligned with display icons showing "gas," "food," and "lodges," respectively. When the system is employed with a Homelink® brand trainable transmitter, the switches can, when the vehicle location and navigation system is off, provide the dual function of operating any one of three programmed transmitting frequencies and codes for up to three different remote electronic systems such as garage doors, home appliances, security gates, or the like.

Figure 5:
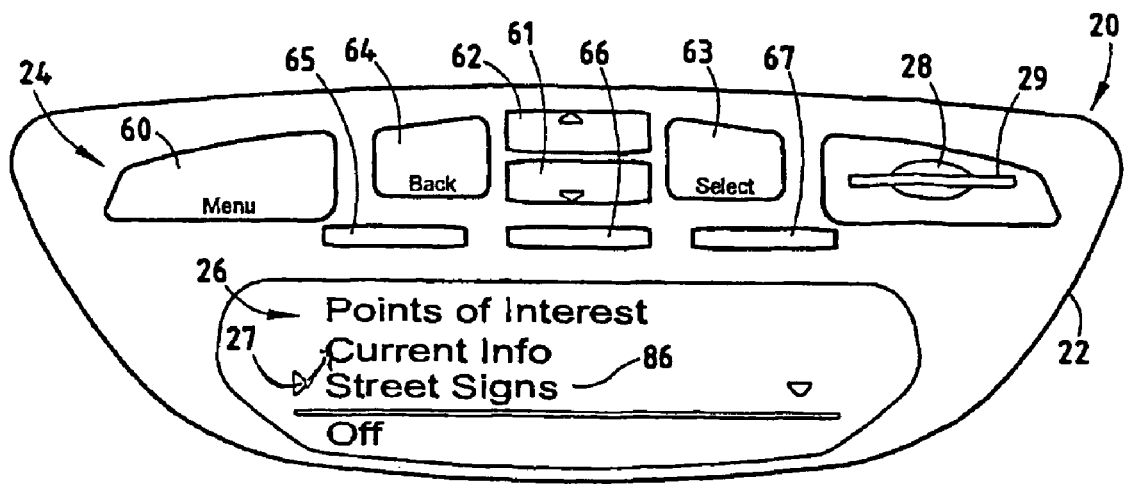
FIG. 5 is a display screen for the main menu in accordance with an embodiment.
Figure 11:
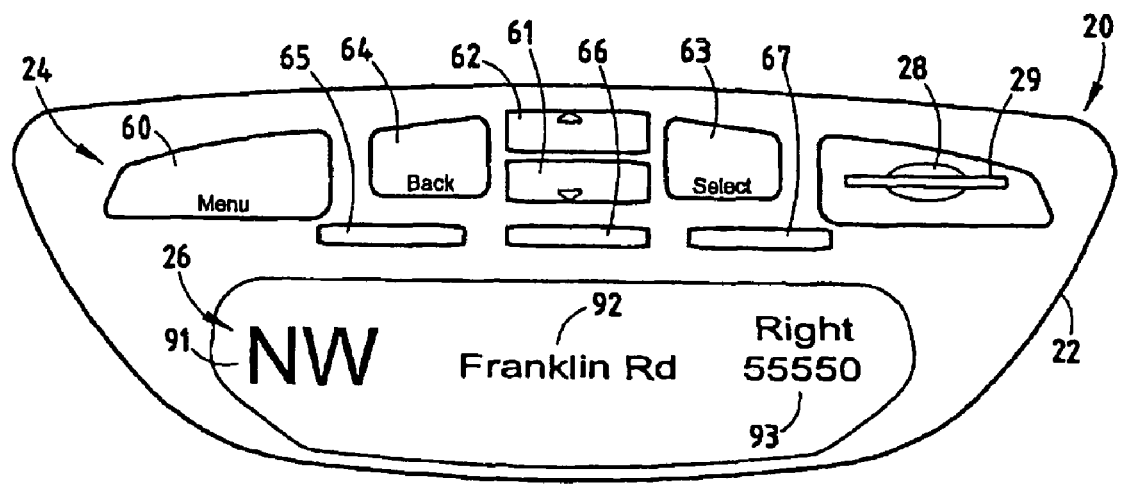
FIG. 11 is the display screen illustrating the information displayed to the vehicle operator when in a street-address mode of operation in accordance with an embodiment.

Initially, when vehicle location and navigation system 20 is powered up, the system searches for satellites and displays a message. In the event a memory card or flashcard 29 has not been inserted, the system displays a message, either that the "memory card has not been inserted" or that "the vehicle is out of the current data coverage zone." Assuming memory card 29 is in place and the vehicle is in the data coverage zone and satellite signals have been received, a display screen as shown in FIG. 5 is displayed on display 26. FIG. 5 is an exemplary display screen for the main menu in accordance with an embodiment. Display 26 allows the operator the option of selecting points of interest (POI), current information which provides any combination of the compass heading, time, date and/or outside temperature information or trip computer information (not shown). The operator may select the information on display 26 by scrolling utilizing scroll switches 61 and 62. The operator may also select the street sign selection to show either the address of a street on which the vehicle is traveling, if on a secondary road, as shown in FIG. 11, or, if the scroll button is advanced and street signs has previously been selected, to the street sign display of FIG. 12.

Figure 6:
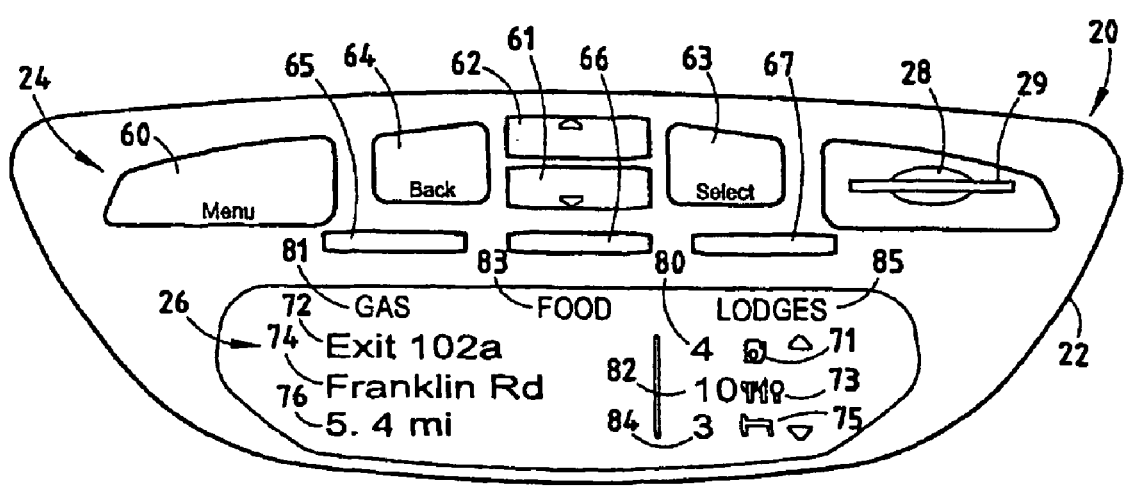
FIG. 6 is the display screen illustrating the information displayed to the vehicle operator when in a highway point of interest mode of operation in accordance with an embodiment.

Assuming the vehicle is on a limited access highway and the operator has selected "points of interest" by scrolling to move the cursor 27, shown in FIG. 5, to the "points of interest" selection, the operator enters select by actuating switch 63, and the highway point-of-interest mode, as shown in FIGS. 2 and 6, is displayed on display 26. Such display provides information as to points of interest according to categories of gas, food or lodging, which are displayed as shown by display icons 71, 73 and 75 in FIGS. 2 and 6. As shown in FIG. 6, display 26 also displays the forthcoming exit which the vehicle is approaching, as indicated by display element 72, the name of the street associated with the exit, as indicated by display element 75, and the distance to the exit, as shown by display element 76. To the left of display icons 71, 73 and 75 is a numerical display 80 for indicating the number of gasoline stations available at that exit (i.e., 4 for exit 102a), a numerical display 82 indicating the number of restaurants available at that exit (i.e., 10), and a numerical display 84 indicating the number of lodges or sleeping accommodations available at that exit (i.e., 3). By actuating scroll switches 61 or 62, the operator can scroll forward to display, for example, the information available at the next exit (No. 103, for example) or the previous exit (No. 101, for example) if at exit 102 a desired POI is not available. Thus, while in the highway POI mode, the vehicle operator can look ahead or behind for points of interest and, as discussed below, select and review available points of interest at a selected exit. This enables the operator to find, for example, a favorite restaurant while traveling when meal time is approaching.

Figure 7:
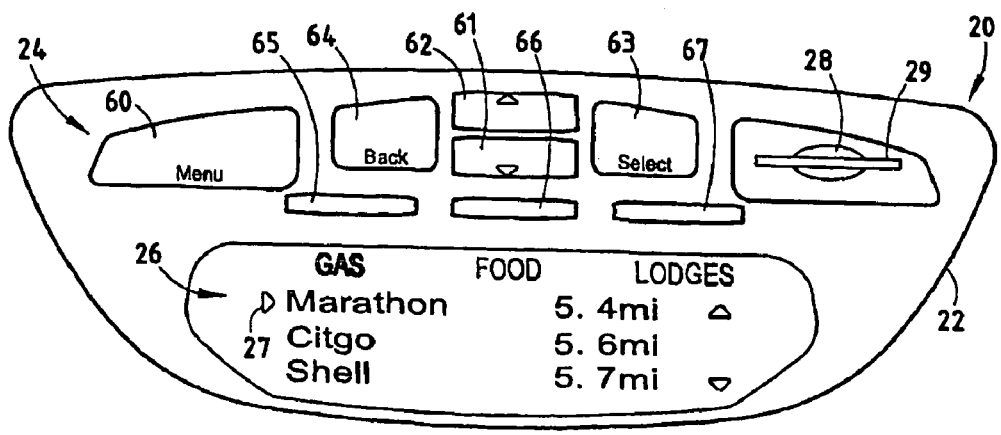
FIG. 7 is the display screen illustrating the information displayed to the vehicle operator when the gas category has been selected in the point of interest mode in accordance with an embodiment.
Figure 8:
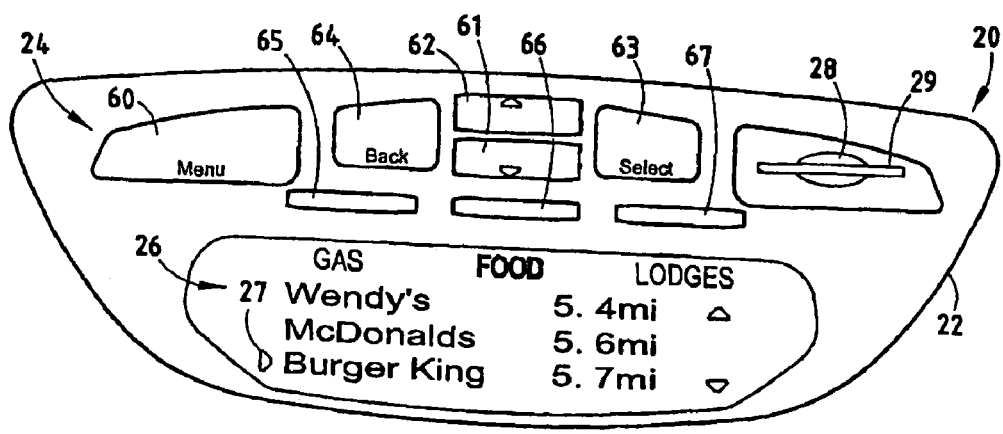
FIG. 8 is the display screen illustrating the information displayed to the vehicle operator when the food category has been selected in the point-of-interest mode in accordance with an embodiment.
Figure 9:
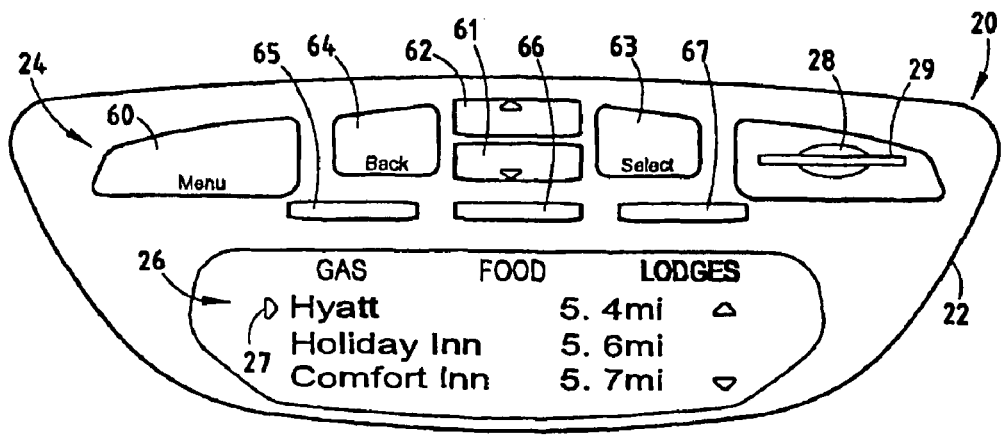
FIG. 9 is the display screen illustrating the information displayed to the vehicle operator when the lodging category has been selected in the point-of-interest mode in accordance with an embodiment.

As the vehicle travels along the highway, the operator can actuate any one of the three keys 65, 66, or 67 aligned above the display 81 of "gas," display 83 of "food," or display 85 of "lodges," respectively, to select details of the establishments in the available categories at a selected exit. Thus, if the gas key 65 is actuates, the display of FIG. 7 appears, and the "gas" icon 81 is illuminated. The display of FIG. 7 provides three service stations available at the selected exit and their distance. A similar display presentation for restaurants is shown in FIG. 8 and for lodging is shown in FIG. 9.

Figure 10A:
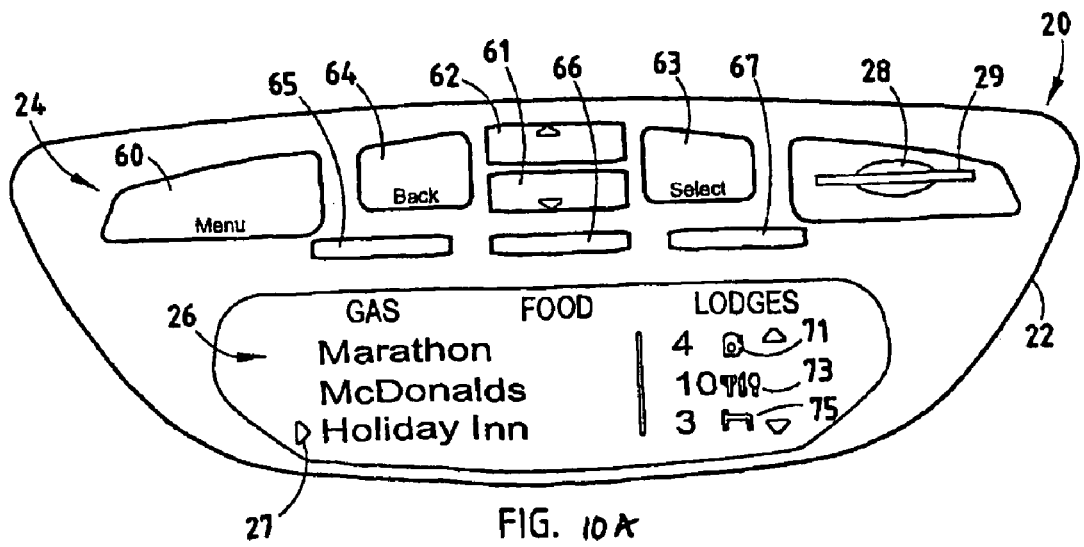
FIGS. 10A and 10B are alternate display screens illustrating the information displayed to the vehicle operator when in a local point-of-interest mode of operation in accordance with an embodiment.
Figure 10B:
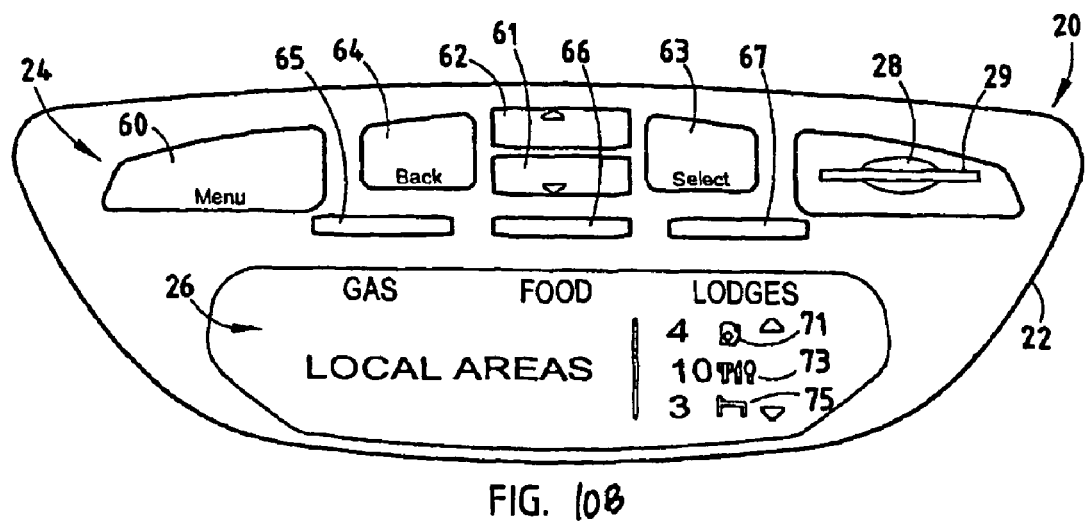

When the vehicle exits the highway, for example, at exit 102, as shown in FIG. 6, the microprocessor 50 (shown in FIG. 3) detects from GPS signals provided by GPS receiver 40 and stored road network data programmed in the memory 31 that it is on a secondary road and automatically switches to one of the local point-of-interest displays shown in FIGS. 10A or 10B, which, unless a POI has previously been selected, automatically displays the categories of points of interest available, the number of points of interest in each category through the icons 71, 73 and 75, and the nearest points of interest within a selectable range of, for example, two to four miles of the nearest points of interest regardless of the category.

Returning to FIG. 5, in addition to the point-of-interest mode of operation, the operator can enter the street sign mode from the main menu by pushing the menu switch 60 and scrolling to street signs. By actuating the select switch 63, the display of FIG. 11 is presented to the operator, which shows the direction 91 of travel of the vehicle, the road 92 on which the vehicle is traveling, and a street address display 93, which shows the street numbers and which increments or decrements as the vehicle travels along the street. This display may provide the operator with the ability to locate a point of interest which may have previously been identified by street number or is otherwise known to the operator. This display is particularly helpful where the point of interest is set back from the road, such as, for example, in a shopping mall or the like, and the address is not readily visible from the road. The displayed address may be interpolated from two known locations and the current vehicle position with respect to such locations as determined by the GPS information. Address information, such as the road mane, is provided in the road network data stored in memory card 29. A system and method for determining the address to display in accordance with an embodiment is discussed further below.

Figure 12:
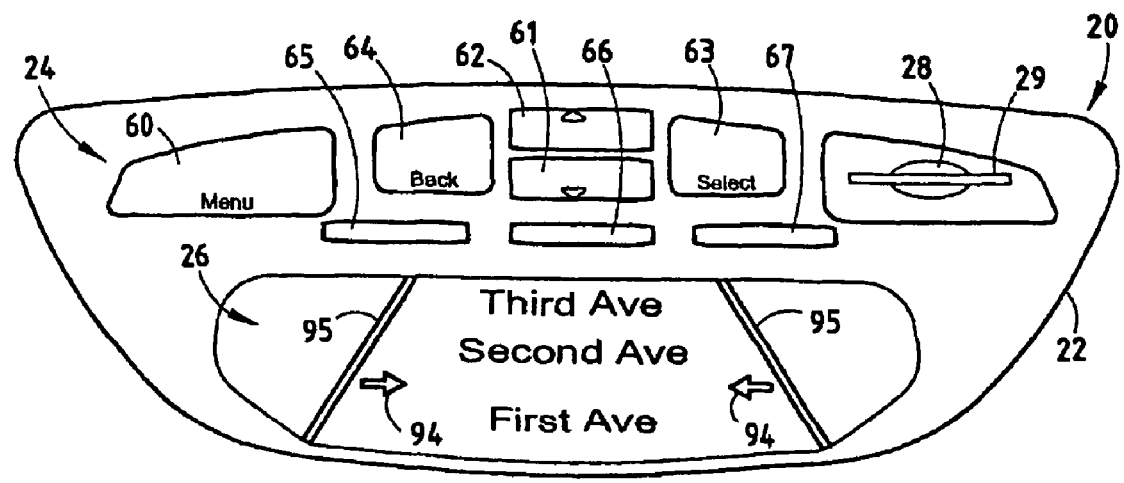
FIG. 12 is the display screen illustrating the information displayed to the vehicle operator when in a street-sign or cross street mode of operation in accordance with an embodiment.

If the operator scrolls forward utilizing switch 61 while in the street sign mode displaying addresses, as shown in FIG. 11, the system enters the display of cross streets, as shown in FIG. 12, in which two streets ahead of the vehicle (e.g., Second Avenue and Third Avenue in FIG. 12) are presented, as are arrows 94 indicating the location of the vehicle between Second Avenue and recently passed First Avenue. This provides the operator with an easily recognizable display of cross streets on a roadway defined by converging graphic lines 95, which includes arrows 94 to provide a clear graphic diagram to the vehicle operator as to the vehicle's location with respect to forthcoming cross streets. In the event that the area does not provide cross-street information or street addresses for a given location of the vehicle, a display is provided to the operator, indicating that such information is not available and the operator must return to the main menu and enter the highway or local point-of-interest mode for guidance.

As mentioned above, an operator may select a street sign mode of the vehicle location and navigation system to view either an address of a street on which the vehicle is traveling or the cross streets of the street on which the vehicle is traveling. Referring to FIG. 3, microprocessor 50 is configured to determine or interpolate the address information to be displayed based on GPS signals received from GPS receiver 40, known locations, and road network information stored in memory card 29. Typically, there may be a time delay or propagation delay between receiving the GPS signals and actually displaying an address or cross street on display 26 resulting in the address or cross street being displayed just as the vehicle arrives at or passes the address. For example, there may be a propagation time between receiving GPS signals, determining the vehicle position (e.g., data such as latitude, longitude, altitude, direction of travel, etc. representative of the vehicle location), interpolating the address (e.g., based on the vehicle position, known locations and the road network data) and displaying the address. Accordingly, microprocessor 50 is configured to correct for any time delay or latency that occurs while determining the address (e.g., street name and/or number) or cross street to display so that the address or cross street is presented to the vehicle operator a predetermined time before the vehicle arrives at or passes the address. Microprocessor 50 receives vehicle speed information 41 from a vehicle speed source such as a sensor, a speedometer, global positioning data, etc. The vehicle speed information as well as the direction the vehicle is traveling is used to predict the location or position of the vehicle at least one time delay or propagation delay in the future. The direction of vehicle travel may be determined based on GPS data points, for example, if the vehicle is traveling at a fixed longitude and the latitude is increasing, the vehicle may be traveling north. Alternatively, the direction of vehicle travel may be provided by a compass heading of compass 46. The vehicle speed and the delay time or selected predetermined time offset are then used to determine a distance offset, i.e., where the vehicle will be a predetermined time from now. Position identifier such as an address or cross street corresponding to this position is identified using the road network information and then displayed on display 26. The vehicle direction of travel is used to, for example, determine whether the address along a street should be increasing or decreasing. Alternatively, the location of the vehicle may be determined for a predetermined time in the future that is more than the propagation delay (e.g., a time corresponding to a safe braking distance) and the address or cross street corresponding to this location displayed on display 26.

Figure 13:
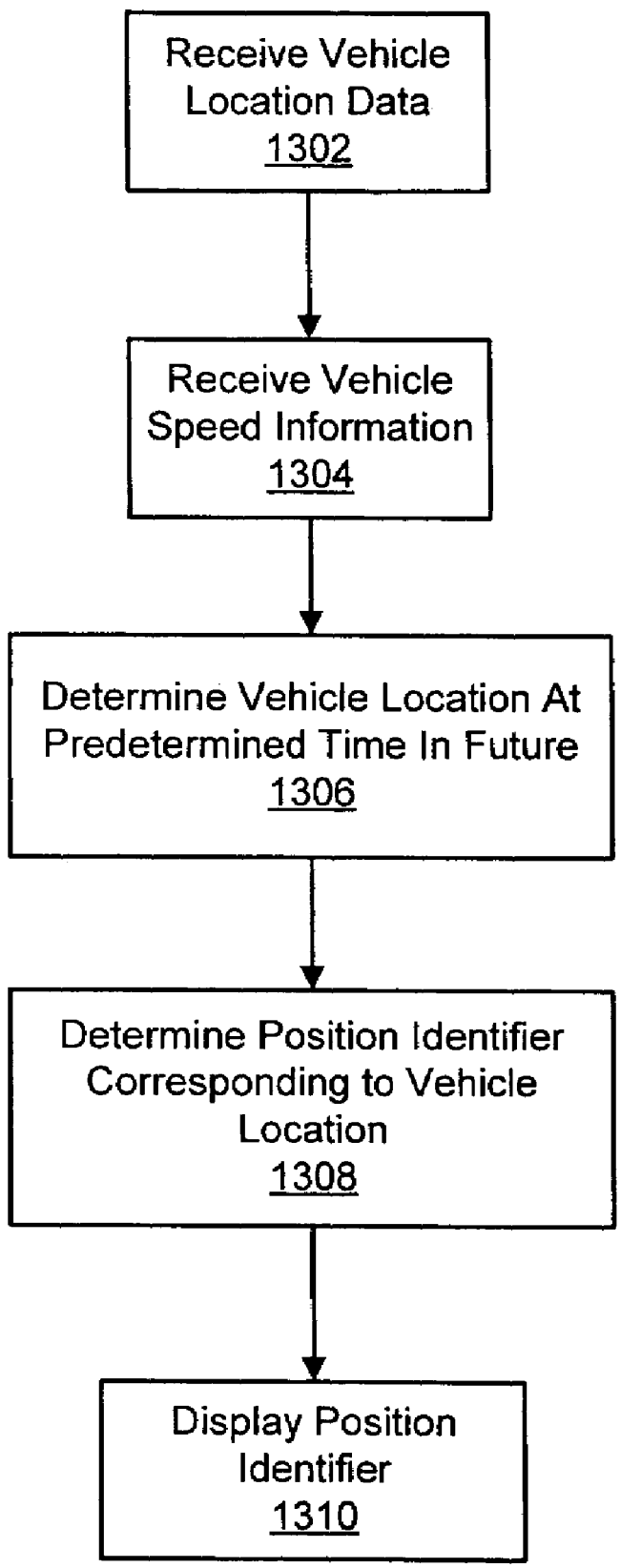
FIG. 13 illustrates a method for displaying vehicle location information in accordance with an embodiment.

FIG. 13 illustrates a method for displaying vehicle location information in accordance with an embodiment. At block 1302, vehicle location information, such as GPS signals, is received from, for example, a GPS receiver that is communication with GPS satellites. In addition, vehicle speed information is received at block 1304 from a vehicle speed sensor in the vehicle such as a speedometer circuit, a displacement differentiator or from global positioning data. The vehicle location information including the direction the vehicle is traveling and the vehicle speed information are used to determine the location of the vehicle a predetermined time in the future at block 1306. For example, the predetermined time may correspond to the propagation delay between receiving the GPS signals and displaying the address corresponding to the location of the vehicle. Alternatively, the predetermined time may correspond to the time required for a safe braking distance of the vehicle. A position identifier such as an address or cross street corresponding to the vehicle location is determined based on the vehicle location and road network information at block 1308. The address is then displayed at block 1310. Accordingly, an address or cross street may be displayed before the vehicle passes the address or cross street.

It is important to note that the construction and arrangement of the systems and devices as shown in the preferred and other exemplary embodiments are illustrative only. Although only a few embodiments of the present invention have been described in detail in this disclosure, those skilled in the art who review this disclosure will readily appreciate that many modifications are possible (e.g., variations in values of parameters, mounting arrangements, orientations, etc.) without materially departing from the novel teachings and advantages of the subject matter recited herein. Accordingly, all such modifications are intended to be included within the scope of the present invention as described herein. The order or sequence of any processes or method steps may be varied or re-sequenced according to alternative embodiments. Other substitutions, modifications, changes and/or omissions may be made in the design, operating conditions and arrangement of the preferred and other exemplary embodiments without departing from the exemplary embodiments of the present invention as expressed herein.

What is claimed:

1. A system for displaying vehicle location information in a vehicle, the system comprising:
    a current location detection device configured to provide location data for a first location of the vehicle representing the vehicle's current location, the location data including a direction of travel for the vehicle;
    a vehicle speed sensor configured to provide vehicle speed data;
    a database of road network information configured to include at least one of street names and addresses along the streets thereon;
    a microprocessor coupled to the current location detection device, the vehicle speed sensor and the database, the microprocessor configured to determine a second location of the vehicle at a predetermined time in the future based on the location data and vehicle speed data and further configured to determine a position identifier corresponding to the second location of the vehicle; and
    a display coupled to the microprocessor and configured to display the position identifier;
    wherein the predetermined time is based on a delay between receiving the location data and displaying the position identifier.

2. A system according to claim 1, wherein the current location detection device is a GPS system comprising a GPS receiver configured to receive GPS positioning data via a wireless link.

3. A system according to claim 2, wherein the vehicle speed data is provided using GPS positioning data.

4. A system according to claim 1, wherein the vehicle speed sensor is a speedometer circuit.

5. A method for displaying vehicle location information in a vehicle, the method comprising:
    receiving location data for a first location of the vehicle representing the vehicle's current location, the location data including a direction of travel for the vehicle;
    receiving vehicle speed data;
    determining a second location of the vehicle at a predetermined time in the future based on the location data and vehicle speed data;
    determining a position identifier corresponding to the second location of the vehicle; and
    displaying the position identifier;
    wherein the predetermined time is based on a delay between receiving the location data and displaying the position identifier.

6. A method according to claim 5, wherein the location data is provided by a global positioning system.

7. A method according to claim 6, wherein the global positioning system comprises a GPS receiver configured to receive GPS positioning data via a wireless link.

8. A method according to claim 6, wherein the vehicle speed data is provided using GPS positioning data.

9. A system according to claim 1, wherein the vehicle speed sensor is a displacement differentiator.

10. A method according to claim 5, wherein the vehicle speed data is provided using speedometer circuit.

11. A method according to claim 5, wherein the vehicle speed data is provided using a displacement differentiator.

12. A system according to claim 1, wherein the microprocessor is further configured to determine the position identifier based on the database of road network information, the position identifier comprising at least street address information.

13. A method according to claim 5, wherein the position identifier is determined based in part on the database of road network information, the position identifier comprising at least street address information.

* * * * *